3,109,819
PREPARATION OF HALOPHOSPHATE PHOSPHOR
George R. Gillooly, Euclid, Jacob G. Rabatin, Chardon, and Thomas C. Vincent, Mayfield Heights, Ohio, assignors to General Electric Company, a corporation of New York
No Drawing. Filed June 20, 1961, Ser. No. 118,245
7 Claims. (Cl. 252—301.6)

This invention relates generally to fluorescent materials or phosphors for use in fluorescent lamps and more particularly to improvements in halophosphate phosphor compositions which are in extensive use in commercial fluorescent lamps. It is an object of the invention to provide a halophosphate phosphor of unique composition which is free from deleterious or diluting substances and which exhibits improved brightness.

Halophosphate phosphors are disclosed in U.S. Patent 2,488,733—McKeag et al. as comprising a matrix $$3M_3(PO_4)_2 \cdot 1M'L_2$$

wherein L represents a halogen or mixture of halogens, and M and M' represent either different or identical bivalent metals or mixtures of such metals. The matrix is activated by one or more activator metals which in commercial practice are generally antimony alone or antimony plus magnanese.

In accordance with the present invention, it has been discovered that the fluorescent apatite phase in halophosphate phosphors is a stoichiometric apatite and that improved fluorescent brightness is achieved, and undesirable phases are avoided, by limiting the phosphor composition to a narrow critical range. The critical nature of the narrow limits of composition in accordance with the invention has been verified by studies of pertinent equilibrium phase relationships, X-ray diffraction techniques and chemical analyses. These studies further demonstrate that halophosphate formulations, such as those previously employed in the art and which depart from the unique composition described herein, contain deleterious or diluting substances or phases. In further accord with the invention, the new desired product cannot be achieved by regulation of either the phosphor formulation alone or the firing conditions alone, but only by careful correlation of both those factors.

In the preparation of halophosphate phosphors in accordance with the invention, the usual batch ingredients or raw materials heretofore employed in the art may be utilized. Such materials include calcium hydrogen phosphate, calcium carbonate, calcium fluoride, calcium chloride or ammonium chloride, manganese carbonate and antimony trioxide. However, the use of particular batch ingredients is not critical and, therefore, ingredients other than those named may be used so long as a proper accounting is made of the chemical contribution of such other ingredients to the final product.

In accordance with the invention, the phosphor formulation is such that the fired product is achieveable by proper regulation of firing conditions and exhibits the compositional relationships $$M_{10-a}P_6O_{24+a}X_{2-a}SB_a$$

where "$a$" is greater than 0.04 and less than 0.10 (i.e. the concentration of antimony in the apatite lattice is greater thand 0.04 atoms per mole of phosphor and less than 0.10 atoms per mole of phosphor), M is the combined proportion of divalent cations (usually calcium alone, or calcium plus manganese in amounts of 0 to about 0.50 atom of manganese per mole of phosphor), P is the proportion of phosphorus atoms, 0 is the proportion of oxygen atoms, and X is the combined proportion of halogen atoms, for example fluorine or chlorine or mixtures thereof.

It will be noted that in the above recited compositional relationship, the variations in antimony content are strictly accounted for by corresponding variations of each of the other components with respect to a fixed molage of 6 atoms of phosphorus. Other divalent cations may, as is known in the art, be partially substituted for calcium, such as cadmium, strontium, barium, magnesium and zinc, preferably in amounts less than 0.50 atom per mole of phosphor.

The final proportions of certain elements can be determined by the original batch formulation, namely, the essentially nonvolatile ingredients calcium, manganese, phosphorus and fluoride. On the other hand, the amounts of the more volatile components, chloride and antimony, retained in the final phosphor cannot be established by formulation alone but are additionally regulated by firing conditions.

The following examples illustrate typical formulations of phosphor compositions in accordance with the invention.

*Example A*

For a blue, antimony activated calcium fluorphosphate, wherein in the above recited compositional relationship "$a$" is about 0.08 atoms per mole, M is calcium, and X is fluorine, the batch may consist of 6 moles $CaHPO_4$, 2.96 moles $CaCO_3$, 0.96 moles $CaF_2$ and 0.05 moles $Sb_2O_3$. It will be noted that there is an excess of 0.02 atoms of antimony per mole of phosphor in the batch formulation. The powdered ingredients are mixed and fired in covered trays or receptacles, preferably essentially of silica, at a temperature in the range of 1140–1200° C. for a period of preferably about 3 hours.

While the general techniques of firing halophosphates are well known in the art, such as the desirability of decreasing temperature with increasing manganese content to obtain a readily friable phosphor cake, it is also recognized that different results may be obtained when using different furnaces, different receptacles or trays, or other accessories in spite of the apparent regulation of time and temperature of firing. It is therefore necessary that the particular firing time and temperature in the recited range be determined empirically to effect volatilization of the 0.02 atoms excess antimony and yield a phosphor which by chemical analysis is found to have the following compositional relationship $$Ca_{9.92}P_6O_{24.08}F_{1.92}Sb_{.08}$$

It will be noted from the batch formulation that the total of 9.92 atoms calcium (6.00+2.96+.96) plus 0.08 atoms antimony (0.05×2—0.02 excess) is equal to 10, as required for the desired formula wherein $M=10-a$, or $M+a=10$. Likewise, the 1.92 fluorine atoms (0.96×2)

plus the value of "$a$" (.08) equals 2, as required for the formula wherein $X=2-a$, or $X+a=2$.

*Example B*

For a cool white, calcium halophosphate activated by both antimony and manganese, and wherein the value of "$a$" is about 0.06 atom per mole, the batch may consist of 6 moles $CaHPO_4$, 2.67 moles $CaCO_3$, 0.17 moles $MnCO_3$, 0.88 moles $CaF_2$, 0.22 moles $CaCl_2$ and 0.09 moles $Sb_2O_3$. The mixture of powdered ingredients is fired in covered trays at a temperature in the range of 1120–1180° C. for about 3 hours to effect formation of the phosphor and volatilization of excesses of 0.12 atoms antimony and 0.26 atom chlorine per mole of phosphor in order to achieve the desired final composition $$Ca_{9.77}Mn_{0.17}P_6O_{24.06}Cl_{0.18}F_{1.76}Sb_{0.06}$$

Here again the total of 9.77 calcium atoms plus 0.17 manganese plus "a" (.09×2—.12 excess=0.06) adds up to 10, and the total of halogen atoms plus "a" (1.76 F+0.44 Cl+.06—0.26 excess Cl) adds up to 2, as required for the desired formula.

*Example C*

For a warm white, calcium halophosphate sensitized by antimony and activated largely by manganese, and wherein the value of "a" is also about 0.06 atoms per mole, the batch formulation may consist of 6 moles CaHPO$_4$, 2.53 moles CaCO$_3$, 0.34 moles MnCO$_3$, 0.88 moles CaF$_2$, 0.19 moles CaCl$_2$ and 0.09 moles Sb$_2$O$_3$. The mixture of powdered ingredients is fired in covered trays at a temperature in the range of 1100–1160° C. for about 3 hours to effect formulation of the phosphor and volatilization of excesses of 0.12 atoms antimony and 0.20 atoms chlorine as in Example B. It will be noted that the increase of 0.17 moles of manganese and decrease of .03 moles of chloride required a corresponding net molar decrease of 0.14 moles of calcium carbonate in order to maintain the M constant in the desired proportion. The final desired composition is $$Ca_{9.60}Mn_{.34}P_6O_{24.06}Cl_{.18}F_{1.76}Sb_{.06}$$

Tests have shown that phosphors of the composition described herein have an increased brightness of about 5–7% as compared with phosphors of compositions heretofore obtained by general practice of the art, and are free from deleterious or diluting substances or phases which are always present in the prior art phosphor compositions. Any deviations from the compositional relationship of ingredients disclosed herein will result in appearance of secondary phases in the final composition. The secondary phases which appear in prior art phosphors, as shown by careful chemical and X-ray analysis, usually comprise such compounds as calcium orthophosphate, calcium manganese orthophosphate, calcium antimonate, or calcium pyrophosphate.

What we claim as new and desire to secure by Letters Patent of the United States is:

1. A fluorescent halophosphate compound having essentially the composition $M_{10-a}P_6O_{24+a}X_{2-a}Sb_a$ wherein: "a" is greater than 0.4 and less than 0.10; M is a divalent metal of the group consisting of calcium alone and mixtures of calcium with at least one of the metals manganese, barium, strontium, cadmium, magnesium and zinc; and X is a halogen from the group consisting of fluorine and chlorine and mixtures thereof.

2. A fluorescent halophosphate compound having essentially the composition $(Ca+Mn)_{10-a}P_6O_{24+a}X_{2-a}Sb_a$ wherein "a" is greater than 0.04 and less than 0.10, and Mn is 0 to about 0.5 atoms per mole of phosphor and X is a halogen from the group consisting of fluorine and chlorine and mixtures thereof.

3. The method of forming a fluorescent halophosphate compound having essentially the composition $$M_{10-a}P_6O_{24+a}X_{2-a}Sb_a$$

wherein: "a" is greater than 0.4 and less than 0.10; M is a divalent metal of the group consisting of calcium alone and mixtures of calcium with at least one of the metals manganese, barium, strontium, cadmium, magnesium and zinc; and X is a halogen from the group consisting of fluorine and chlorine and mixtures thereof; which comprises mixing a batch of ingredients which will yield the said halophosphate composition upon firing and wherein the batch proportions of divalent metal, phosphorus, and fluorine, when present, are as set forth in the aforesaid composition, and the batch proportions of antimony and chlorine, when present, are in slight excess over those set forth in the aforesaid composition to the extent that the said excess of antimony and chlorine is volatilized during firing to form the compound at a temperature in the range of 1100–1200° C., and firing the batch to a temperature in said range which will form the compound and volatilize the excess antimony and chlorine.

4. The method of forming a fluorescent halophosphate compound having essentially the composition $$(Ca+Mn)_{10-a}P_6O_{24+a}X_{2-a}Sb_a$$

wherein "a" is greater than 0.04 and less than 0.10, and Mn is 0 to about 0.5 atoms per mole of phosphor and X is a halogen from the group consisting of fluorine and chlorine and mixtures thereof; which comprises mixing a batch of ingredients which will yield the said halophosphate composition upon firing and wherein the batch proportions of calcium, phosphorus, and manganese and fluorine, when present, are as set forth in the aforesaid composition, and the batch proportions of antimony and chlorine, when present, are in slight excess over those set forth in the aforesaid composition to the extent that the said excess of antimony and chlorine is volatilized during firing to form the compound at a temperature in the range of 1100–1200° C., and firing the batch to a temperature in said range which will form the compound and volatilize the excess antimony and chlorine.

5. The method of preparing a halophosphate phosphor which comprises mixing a batch of ingredients consisting essentially of 6 moles CaHPO$_4$, 2.96 moles CaCO$_3$, 0.96 moles CaF$_2$ and 0.05 moles Sb$_2$O$_3$, and firing the batch at a temperature in the range of 1140–1200° C. which will effect volatilization of an 0.02 atom per mole excess of antimony and yield a phosphor of the composition.

$$Ca_{9.92}P_6O_{24.08}F_{1.92}Sb_{.08}$$

6. The method of preparing a halophosphate phosphor which comprises mixing a batch of ingredients consisting essentially of 6 moles CaHPO$_4$, 2.67 moles CaCO$_3$, 0.17 moles MnCO$_3$, 0.88 moles CaF$_2$, 0.22 moles CaCl$_2$ and 0.09 moles Sb$_2$O$_3$, and firing the batch at a temperature in the range of 1120–1180° C. which will effect volatilization of excesses of 0.12 atoms antimony and 0.26 atoms chlorine per mole of phosphor and yield a phosphor of the composition.

$$Ca_{9.77}Mn_{0.17}P_6O_{24.06}F_{1.76}Cl_{0.18}Sb_{.06}$$

7. The method of preparing a halophosphate phosphor which comprises mixing a batch of ingredients consisting essentially of 6 moles CaHPO$_4$, 2.53 moles CaCO$_3$, 0.34 moles MnCO$_3$, 0.88 moles CaF$_2$, 0.19 moles CaCl$_2$ and 0.09 moles Sb$_2$O$_3$, and firing the batch at a temperature in the range of 1100–1160° C. which will effect volatilization of excesses of 0.12 atoms antimony and 0.20 atoms chlorine per mole of phosphor and yield a phosphor of the composition $$Ca_{9.60}Mn_{.34}P_6O_{24.06}F_{1.76}Cl_{.18}Sb_{.06}$$

References Cited in the file of this patent

UNITED STATES PATENTS

| | | |
|---|---|---|
| 2,488,733 | McKeag et al. | Nov. 22, 1949 |
| 2,544,663 | Fortney et al. | Mar. 13, 1951 |
| 2,579,900 | Bulter | Dec. 25, 1951 |
| 2,592,261 | Fonda | Apr. 8, 1952 |
| 2,755,254 | Bulter | July 17, 1956 |
| 2,904,516 | Ross et al. | Sept. 15, 1959 |
| 2,965,786 | Aia et al. | Dec. 20, 1960 |
| 2,976,249 | Rimbach et al. | Mar. 21, 1961 |

UNITED STATES PATENT OFFICE
CERTIFICATE OF CORRECTION

Patent No. 3,109,819                                       November 5, 1963

George R. Gillooly et al.

It is hereby certified that error appears in the above numbered patent requiring correction and that the said Letters Patent should read as corrected below.

Column 3, lines 48 and 65, for "0.4", each occurrence, read -- 0.04 --; column 4, lines 37 and 38 and line 48, after "composition", each occurrence, strike out the period.

Signed and sealed this 28th day of April 1964.

(SEAL)
Attest:
ERNEST W. SWIDER

Attesting Officer

EDWARD J. BRENNER
Commissioner of Patents